G. A. BADER.
AXIS INDICATOR.
APPLICATION FILED APR. 7, 1910.

981,832.

Patented Jan. 17, 1911.

Witnesses:
C. W. Carroll
L. Thow

Inventor:
Gustav A. Bader
by his attorneys
Osgood, Davis & Dorsey

UNITED STATES PATENT OFFICE.

GUSTAV A. BADER, OF ROCHESTER, NEW YORK, ASSIGNOR TO THE STANDARD OPTICAL COMPANY, OF GENEVA, NEW YORK, A CORPORATION OF NEW YORK.

AXIS-INDICATOR.

981,832.  Specification of Letters Patent.  Patented Jan. 17, 1911.

Application filed April 7, 1910. Serial No. 554,068.

*To all whom it may concern:*

Be it known that I, GUSTAV A. BADER, a citizen of the United States, and resident of Rochester, in the county of Monroe and State of New York, have invented certain new and useful Improvements in Axis-Indicators, of which the following is a specification.

This invention is a device for use in connection with cylindrically curved lenses, such as are largely used in optical work for eye glasses, the device being used to indicate the angular position of the axis of cylindrical curvature with respect to the longitudinal or horizontal axis of the lens.

One object of the invention is to produce an axis indicator of the kind above referred to which may be conveniently held in the hand, and which shall have means both for automatically adjusting and holding the lens in a definite position upon the device and for indicating the inclination of the device in the plane of the lens when the lens is turned to bring its cylindrical axis to a definite position with respect to external objects.

Another object of the invention is to produce an axis indicator having a simple and convenient device or inclinometer for indicating the inclination thereof, these means being so constructed as to register the inclination accurately without the necessity of immediate inspection during the determination of the axis.

To the above ends the invention consists in an axis indicator constructed substantially as in the case of the illustrated embodiment of the invention hereinafter described, as the same is defined in the succeeding claims.

Figure 1:
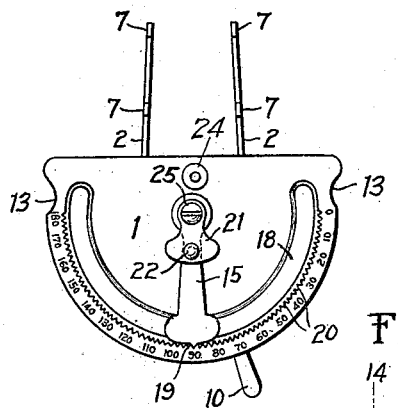
Figure 2:
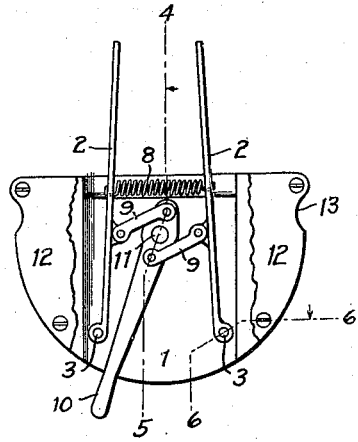
Figure 3:
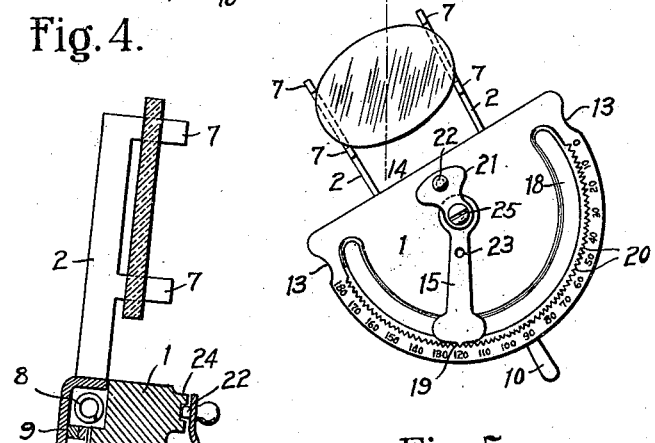
Figure 4:
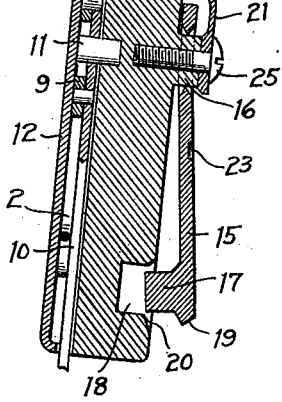
Figures 5, 6:
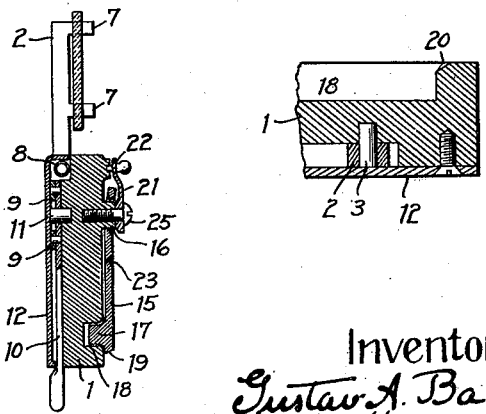

In the accompanying drawings: Figure 1 is a front elevation of an axis indicator embodying the present invention; Fig. 2 is a rear elevation of the axis indicator, with the back plate broken away to show the interior mechanism; Fig. 3 is a front elevation of the device while in use, with a lens in the clutch and with the body tilted in the plane of the lens to bring the cylindrical axis of the lens to vertical position; Fig. 4 is an enlarged section on the line 4—5 in Fig. 2, looking from right to left, with the lens in place and the device in position for use; Fig. 5 is a similar section on a smaller scale, showing the device in position to register the indication of the inclinometer; and Fig. 6 is an enlarged detail sectional view on the line 6—6 in Fig. 2, looking downward.

The illustrated embodiment of my invention is provided with a body 1 which is adapted to be held conveniently in the hand and upon which the lens clutch and the inclinometer are mounted.

The clutch comprises two upwardly-extending arms 2 which are pivoted at their lower ends upon pins 3 within a recess at the back of the body 1. The clutch arms have each two forwardly-extending horizontal fingers 7 between which the lens is held. A tension spring 8 connects the arms and tends constantly to swing them toward each other so as to hold them in engagement with the lens. In order that the clutch arms may act in a definite and positive manner it is necessary that they be so controlled as to move from and toward each other through equal distances in opposite directions, and to this end the arms are connected, by means of two pivoted links 9, with a lever 10 which is pivoted upon a pin 11 in the recess at the back of the body. The links 9 are connected at equal distances above and below the pivot 11, so that a given movement of one arm is necessarily coördinated, through the links and the lever, with an equal movement in the opposite direction of the other arm.

To move the clutch arms apart when a lens is to be inserted the lever 10 is swung in the proper direction, and for this purpose its lower end is extended below the body 1 in convenient position to be operated by the user of the device.

The recess at the back of the body is closed by a plate 12 secured in place by screws, as shown in Figs. 2 and 6. The body is provided with shallow recesses 13 at either side for convenience in holding the body. When the device is to be used the thumb and forefinger of the user are placed in these recesses with the hand behind the body of the device, and the lever 10 may then be conveniently operated by means of the little finger. In this way the indicator is held and the clutch opened with one hand, while the other hand is free to insert the lens. The construction of the clutch above described is such that when used in connection with an eye glass lens of the ordinary elliptical form, or of any of the commonest modifications of such form, the pins 7 will automatically turn the lens to a position in which the longitudinal axis of its outline is horizontal when the indicator is held in the normal upright position of Figs. 1 and 2. This is the position which the lens occupies when fitted in the frame or mounting of the eye glass, and the angle or inclination of the cylindrical axis which is to be measured is the angle between the cylindrical axis and this longitudinal horizontal axis.

The method by which the angle in question is determined consists in tilting the device as a whole in, or substantially in, the plane of the lens held in the clutch until the cylindrical axis of the lens is vertical, and then measuring the inclination of the device in the plane of the lens, the inclinometer used for this purpose being so graduated that the reading so secured is a direct indication of the angle to be determined. The inclinometer in the illustrated construction comprises a weighted arm or pendulum 15 which is suspended upon a boss 16 projecting from the front of the body. The pendulum is provided with knife edges at its point of engagement with the boss, as shown in Fig. 4, to reduce friction at this point, and the form of this support is such that the pendulum may swing either across the face of the body or toward and from the body. The lower end of the pendulum is provided with a rearwardly-extending weight 17 which moves in a curved recess 18 in the body. At the lower end of the pendulum is a pointed lug or pointer 19 which coöperates with a series of notches 20 formed at the lower edge of the recess 18. Adjacent to these notches are numerical designations of angles, as shown in Figs. 1 and 3. When the position of the axis of a lens is to be determined the lens is inserted in the clutch, as shown in Fig. 3, and the body of the indicator is then tilted slightly forward, as shown in Fig. 4, so that the pointer 19 swings clear of the notches 20. The operator now sights through the lens at a vertical mark or line of some character, such as the line 14—14 in Fig. 3, and then turns the indicator, in the plane of the lens, until the image of the vertical line as seen through the lens coincides in direction with the portions of the line above and below the lens. The occurrence of this optical phenomenon indicates that the lens is in a position in which its cylindrical axis is vertical. The operator thereupon tilts the indicator backwardly to vertical position, as in Fig. 5, and this causes the pendulum to swing inward until the pointer seats itself in the notch with which it most nearly coincides, the notches being arranged so close together that the pointer necessarily slides into one or the other of them. The pendulum is now held securely against accidental movement, and the user of the device may note the reading so registered at his leisure and without the necessity of simultaneously continuing the sight through the lens. While the notches and the pointer constitute a device of great certainty for fixing the pendulum in indicating position it will be apparent that even without these devices the pendulum would register its indication when the indicator is used in the manner described, owing to frictional engagement between the pendulum and the body, and my invention is not, therefore, limited to the use of the pointer and the notches.

To secure the pendulum against movement when the indicator is not in use, a detent is employed in the form of a spring arm 21 which is pivoted upon a screw 25 in the boss 16. The spring arm carries a stud 22 which may be engaged with a depression 23 in the pendulum so as to hold the pendulum close against the body 1. When the detent is not in use the stud is engaged with a recess in a boss 24 on the body 1. Fig. 1 shows the detent in use, and Figs. 3, 4 and 5 show the detent in inoperative position.

I am aware that the above-described method of indicating the cylindrical axis of a lens is not broadly new, but such apparatus as has heretofore been provided for this purpose has been defective in that it has not had provision for automatically adjusting the lens to a definite position with respect to the inclinometer. I am also the first, so far as I am aware, to produce an inclinometer which is adapted to register accurately and conveniently the inclination of the lens while the operator is sighting through the lens at the vertical line.

My invention is not limited to the details of construction of the illustrated embodiment thereof, but may be embodied in various forms within the nature of the invention as it is defined in the following claims.

I claim:—

1. An axis indicator having, in combination, a body adapted to be held in the hand, means for automatically adjusting an elongated lens to and holding it in definite position upon the body, and means for indicating the inclination of the body in the plane of the lens.

2. An axis indicator having, in combination, a body adapted to be held in the hand, means for holding a lens upon the body, an inclinometer for indicating the inclination of the body in the plane of the lens, and means for fixing the inclinometer in indicating position, said means being operated by a change of inclination of the body in a direction transverse to the plane of the lens.

3. An axis indicator having, in combination, a body adapted to be held in the hand and provided with finger-holds at either side, a clutch arranged to hold a lens in position above the body, and a clutch-operating member extending below the body in position to be operated by the little finger.

4. An axis indicator having, in combination, a body, means for holding a lens upon the body, and an inclinometer comprising a pendulum pivoted to the body and having provision for movement about its pivotal support both in the plane of the lens and in a direction transverse to said plane, and the body having a series of graduations and a portion formed to engage and hold the pendulum when the latter is swung toward the body.

5. An axis indicator having, in combination, a body, means for holding a lens upon the body, an inclinometer comprising a pendulum pivotally supported upon the body, and means for maintaining the pendulum in inoperative condition comprising a resilient detent arranged to engage the pendulum and secure it against pivotal movement.

GUSTAV A. BADER.

Witnesses:
L. THON,
C. W. CARROLL.